United States Patent [19]

Howerton et al.

[11] 4,216,679
[45] Aug. 12, 1980

[54] POWER TRANSMISSION BELT

[75] Inventors: Anderson W. Howerton, Nixa; Darrell L. Klein; James R. Thomas, both of Springfield, all of Mo.

[73] Assignee: Dayco Corporation, Dayton, Ohio

[21] Appl. No.: 966,441

[22] Filed: Dec. 4, 1978

[51] Int. Cl.³ ................. F16G 5/08; F16G 5/22
[52] U.S. Cl. .................... 474/238; 474/263; 474/271; 474/139
[58] Field of Search ............. 74/233, 234, 237, 230, 74/232; 156/139, 142

[56]  References Cited
U.S. PATENT DOCUMENTS

| | | | |
|---|---|---|---|
| 2,296,740 | 9/1942 | Reiting | 74/234 |
| 2,728,239 | 12/1955 | Adams, Jr. | 74/233 X |
| 3,151,491 | 10/1964 | Case | 74/233 X |
| 3,164,026 | 1/1965 | Terhune | 156/141 X |
| 3,404,577 | 10/1968 | Zahn | 74/233 X |
| 3,523,461 | 8/1970 | Nemecek et al. | 74/229 |
| 3,564,933 | 2/1971 | Clinkenbeard | 74/233 |
| 3,838,605 | 10/1974 | Muller | 74/234 |
| 3,839,116 | 10/1974 | Thomas et al. | 74/234 |
| 3,853,017 | 12/1974 | White, Jr. et al. | 74/234 |
| 3,951,006 | 4/1976 | Fisher et al. | 74/233 |
| 3,996,813 | 12/1976 | Henderson et al. | 74/233 |
| 4,011,766 | 3/1977 | Waugh | 74/234 |

FOREIGN PATENT DOCUMENTS 720344  12/1954  United Kingdom ............. 74/234

Primary Examiner—C. J. Husar
Assistant Examiner—Conrad Berman
Attorney, Agent, or Firm—Reuben Wolk; Charles E. Bricker

[57] ABSTRACT

An endless power transmission belt is provided which comprises a first portion defining the bottom surface of the belt and comprising a plurality of laterally spaced power transmitting ribs and a groove between each adjacent rib, a second portion bonded to the first portion and acting as a tie band therefor and for the third portion which defines the top surface of the belt and also comprises a plurality of laterally spaced power transmitting ribs and a groove between each adjacent rib. The third portion is symmetrical with the first portion and the grooves in each portion provide a relief area between the ribs to allow debris to work through the tie band and become discharged.

16 Claims, 6 Drawing Figures

POWER TRANSMISSION BELT

This invention relates to power transmission belts which are intended for use on multi-grooved pulleys.

Multiple wedge belts are particularly suitable for power transmission where abrupt changes of loading occur. In a drive system with a plurality of single belts independent of one another, such operation causes flapping, vibration and twisting of the belts and leads to their premature destruction.

The cooperation of the individual belts is also affected by unavoidable manufacturing tolerances and wearing of the pulley grooves. As a result, under tensile stress, the belts lie differently in the grooves and consequently the belts tend to lead or lag behind one another. A web interconnecting the individual belts has the function of opposing a resilient resistance to the relative movements of the belts and of taking up the shear forces that result from this, so transmitting these forces that the belts are coordinated in their behavior and cooperate as a unit in their overall operation. Examples of these belts are set forth in the following U.S. Pat. Nos.: 3,523,461, 3,564,933, 3,853,017, 3,966,813 and 4,011,766.

In certain drive system applications it is desirable to transmit power from both sides of the belt. The ordinary trapezoidal belt, known in the art as a "V-belt", and the banded, multiple V-belts described above are capable of transmitting power from both sides of the belt, but the power transmitting capacity of the flat or nearly flat back side is much less than that of the non-parallel V-shaped sides. The power transmitting capacity of the top and bottom sides of a single belt is made approximately equal by providing a hexagonal shaped belt, known in the art as a "double V-belt", as disclosed, for example, in U.S. Pat. Nos. 2,296,740 and 3,164,026.

Multiple ribbed belts having ribs on both the top and bottom sides of the belt are known in the art. Examples of such belt are disclosed in U.S. Pat. Nos. 2,728,239 and 3,839,116. The belts disclosed in these patents are known in the art as "V-ribbed" belts. These belts derive their power transmitting function from surface contact between the belt surfaces and the pulley surfaces. These belts do not provide the "wedging" action normally associated with the "V" type belts and are not capable of transmitting the heavy loads normally required of V-belts. It is proposed in the aforesaid U.S. Pat. No. 3,839,116 to truncate the ribs, thereby providing, in effect, a double, banded power transmission belt having trapezoidal driving elements.

In drive system applications which require the transmission of power from both sides of a belt with equal capacity and wherein abrupt changes of loading occur, precautions must be taken to exclude foreign material from the drive system. In an application such as, for example, a rock crusher, it is not always possible or practical to completely isolate the drive system from the material being handled. Consequently, small pieces of rock do get into the drive system. Such pieces may fall into and become lodged in the groove between the V-type elements of a multiple, banded belt. These pieces may damage the belt pulleys and/or the belt, resulting in premature belt failure.

I have made a double, multiple wedge belt which is particularly suitable for applications such as rock crushing in which foreign matter has heretofore damaged the belt pulleys and/or drive belt. My belt is constructed such that foreign matter may pass through the band which ties together the multiple belt elements.

Accordingly, it is an object of the present invention to provide a novel belt construction.

Other objects, aspects and advantages of the present invention will be apparent to those skilled in the art from the following detailed description, the appended claims and the attached drawing.

In accordance with the present invention there is provided a multiple ribbed power transmission belt for use with multiple grooved pulleys in a serpentine drive system, i.e., in a drive system wherein both sides of the belt are employed as driving sides. The belt of this invention comprises a first portion having one face defining the bottom surface of the belt and comprising a plurality of laterally spaced truncated V-shaped power transmitting ribs and a groove between each adjacent rib penetrating from the bottom surface and terminating at the opposite top surface; a second portion bonded to the top surface of the first portion; and a third portion having one face defining the top surface of the belt and comprising a plurality of laterally spaced truncated V-shaped power transmitting ribs and a groove between each adjacent rib penetrating from the top surface of the third portion to the opposite bottom surface of the third portion, the bottom surface of the third portion being bonded to the second portion and the third portion being symmetrical with the first portion about the second portion.

In the drawing,

FIG. 4 is an exploded isometric view showing the parts of a belt of this invention;

FIGS. 3–5 are end views of embodiments of this invention; and

FIG. 6 illustrates the angular relationship between the warp and weft threads of a woven fabric.

Figures 1, 2:
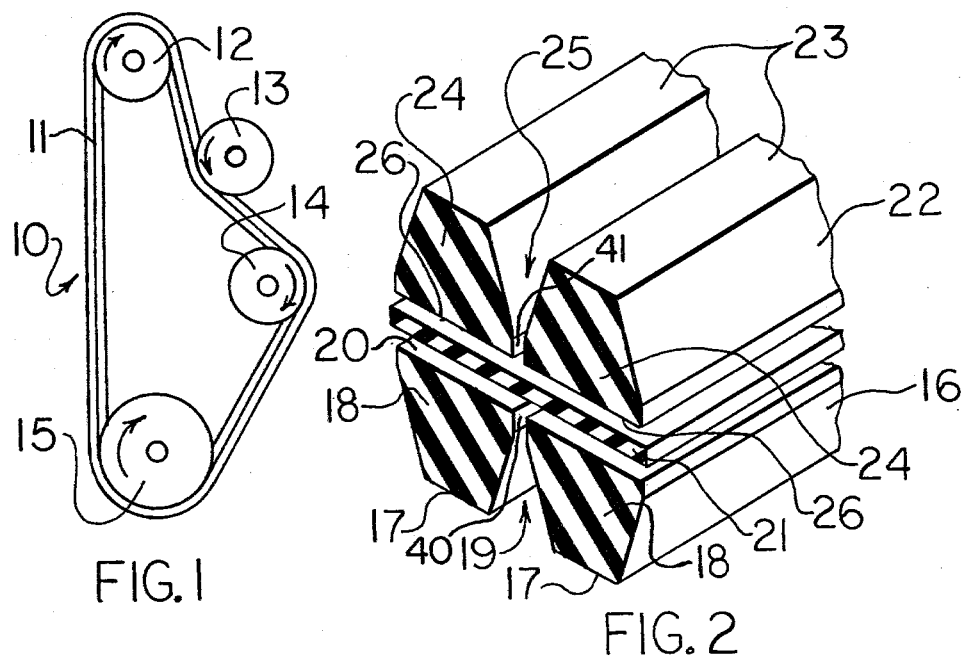
FIG. 1 illustrates a serpentine drive system.

Reference is now made to FIG. 1 which illustrates a drive system 10 which utilizes one exemplary embodiment of an endless double banded belt, which is designated generally by the reference number 11. The drive system 10 employs a plurality of multi-groove belt pulleys or sheaves having configurations and diameters as determined by their associated driving and driven components. For example, the drive system 10 employs a driving sheave 12 which is operatively connected to a motor or engine or other source of rotary power, not shown, and driven sheaves 13, 14 and 15 which are operatively connected to devices requiring rotary power. The belt 11 is disposed around the sheaves 12–15. The driving sheave 12 and the driven sheaves 14 and 15 rotate in the same direction while the driven sheave 13 rotates in the opposite direction.

As shown in FIG. 2, the belt 11 comprises a first portion 16 having a face 17 defining the bottom surface of the belt. The terms "bottom" and "top" are used herein to aid in describing the belt structure and are not intended to indicate the running attitude of the belt in use. The first portion 16 comprises a plurality of laterally spaced, power transmitting ribs 18, each having a truncated V cross-section, and a groove 19 between each adjacent rib. The groove 19 penetrates from the bottom surface 17 and terminates at the opposite top surface 20 of the first portion 16.

A second portion 21 is bonded to the top surface 20 of the first portion 16.

Third portion 22 has one face 23 which defines the top surface of the belt. The third portion 22 also comprises a plurality of laterally spaced, power-transmitting ribs 24, each having a truncated V cross-section, and a groove 25 between each adjacent rib. The groove 25 penetrates from the top surface 23 and terminates at the opposite bottom surface 26 of the third portion 22. The bottom surface 26 of the third portion 22 is bonded to the second portion 21 and the ribs 24 are symmetrical about the second portion 21 with the ribs 18.

The ribs 18 and 24 are made primarily of an elastomeric material such as rubber, either natural or synthetic, or a thermoplastic elastomer, or the like.

Figures 3, 4:
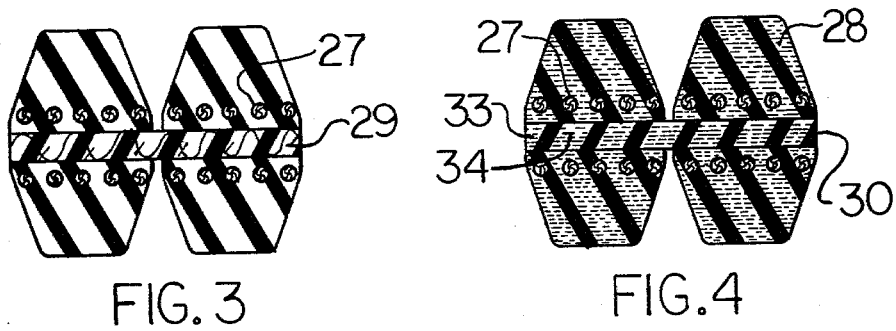

The ribs 18 and 24 may have load-carrying means embedded therein, such means shown in FIGS. 3 and 4 as a plurality of helically wound cords 27. The ribs 18 and 24 may also have a plurality of discrete fibers 28 dispersed homogeneously through the elastomeric material used to make such ribs as shown in FIG. 4. The fibers 28 may be natural or synthetic such as cotton, rayon, nylon, aramid, polyester and the like. The fibers 28 may be employed in an amount ranging from 0.01 to about 40 parts by weight per 100 parts by weight of elastomer.

Figures 5, 6:
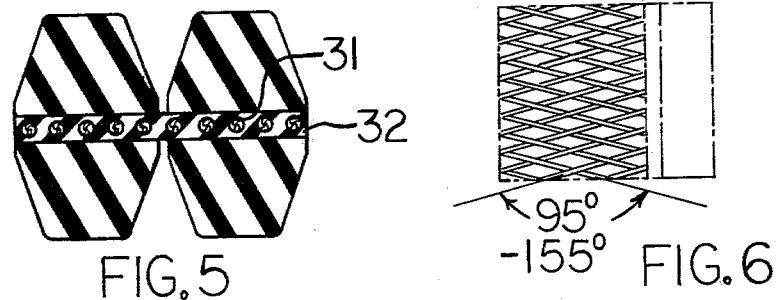

The second portion 21 may be made of fabric 29, as shown in FIG. 3, or of a fiber/elastomer 30, as shown in FIG. 4, or of a plurality of longitudinally extending strength cords 31 embedded in a suitable elastomeric material 32 as shown in FIG. 5.

Referring to FIG. 3, the fabric 29 may be made of such fibers as cotton, rayon, polyester, nylon, aramid, or other materials normally used in belt construction. This fabric is embedded in an elastomeric layer which is similar to the material used for the ribs 18 and 24. The fabric 29 is laid on the bias so that the threads are diagonal to the longitudinal direction of the belt. This provides the tie which is necessary for this type of belt and provides the transmission of load from one rib to the other in a manner which is independent of the modulus of the threads which form the fabric. The warp and weft threads of the fabric 29 may have a 90 degree relationship or they may, preferably, be at an angle between 95 degrees and 155 degrees (as shown in FIG. 6).

Referring now to FIG. 4, the second portion 21 may be made of a fiber/elastomer matrix 30 which comprises a suitable elastomer 33 which has a plurality of fibers 34 dispersed homogeneously therethrough. At least about 50 percent of the fibers 34 are oriented and the direction of fiber orientation lies at an angle in the range of 45° to 90° to the length direction of the belt, preferably 90° to the length direction. The fibers 34 may be any fiber, natural or synthetic, such as cotton, rayon, polyester, nylon, aramid, brass, steel or the like. The amount of the fibers 34 in the matrix 30 can range from 10 to 50 parts by weight per 100 parts by weight of the elastomer, preferably about 20 to 40 parts.

As shown in FIG. 5, the second portion can be made of a plurality of longitudinally extending strength cords 31, embedded in a suitable elastomer 32. The cords 31 may be any cord known in the art, such as polyester, glass fiber, aramid, or the like. Aramid cord is presently preferred.

The power transmission belt of this invention may be fabricated by the steps of forming a belt sleeve, cutting a plurality of belt bodies therefrom, assembling the uncured belt bodies together with the desired second portion and curing the complete assembly. Regardless of the method used to fabricate the belt of this invention, it is necessary that the grooves between each adjacent power transmitting rib extend inwardly to the second portion, i.e., the tie band portion, to thus provide a relief area between such ribs to allow debris to work through the tie band and become discharged. Such relief area may be provided by spacing the ribs a desired distance apart in the lateral direction, or by removing a portion of the non-parallel sides of the ribs to provide relief areas 40 and 41 between the ribs, as shown in FIG. 2. In operation, debris trapped in the belt grooves 19 or 25 is pushed into the relief area 40 or 41, respectively, by the sheave as the sheave engages the groove of the belt, and such debris, if of sufficient size, may be pushed on through the tie band. It is also necessary that the tie band allow such debris to penetrate the same. Thus, in the case of a fabric tie band, as shown in FIG. 3, it is desirable that the weave of such fabric be sufficiently open to allow particles of up to about 0.1" (2.5 mm) in cross-section to work through the tie band without causing separation between the tie band and the tops of the power transmitting ribs. When the tie band is a helically laid cord, as shown in FIG. 5, it may be desirable to provide a space between adjacent cords of up to about 45% of the cord diameter.

The belts of this invention are illustrated in the drawings as being made of rubber; however, it will be appreciated that such belts may be made of any suitable elastomeric material including all types of synthetic plastic materials used in the art of making power transmission belts.

Various changes and modifications may be made in the present invention without departing from the scope and spirit thereof.

We claim:

1. A multi-ribbed power transmission belt made primarily of elastomeric material for use with multi-grooved pulleys in a serpentine drive system, said belt comprising:
   a. A first portion having one face defining the bottom surface of said belt and comprising a plurality of laterally spaced power-transmitting ribs, each of said ribs having a cross-sectional configuration adapted to conform to a groove of said pulley, and a groove between each adjacent rib penetrating from said bottom surface and terminating at the opposite top surface of said first portion;
   b. A second portion bonded to said top surface of said first portion; and
   c. A third portion having one face defining the top surface of said belt and comprising a plurality of laterally spaced power-transmitting ribs, each of said ribs having a cross-sectional configuration adapted to conform to a groove of said pulley, and a groove between each adjacent rib penetrating from said top surface of said third portion and terminating at the opposite bottom surface of said third portion; said bottom surface of said third portion being bonded to said second portion, and said third portion being symmetrical with said first portion about said second portion wherein said grooves between said adjacent ribs in said first portion and said second portion are configured to provide relief areas between said ribs and adjacent second portion to allow debris to work through said second portion and thereby become discharged.

2. The belt of claim 1 wherein each rib is of a generally trapezoidal cross-sectional configuration and each groove is of a generally V-shaped cross-sectional configuration.

3. The belt of claim 1 wherein said second portion is comprised of a layer of fiber-loaded elastomer, wherein the fibers of said layer are oriented in a direction transverse to the endless path of said belt.

4. The belt of claim 1 wherein said ribs in said first and said third portions additionally comprise at least one stress-resisting member embedded therein with each member extending longitudinally of said belt and disposed across the width of each rib.

5. The belt of claim 4 wherein said stress-resisting member is a plurality of parallel longitudinal cords.

6. The belt of claim 4 wherein said second portion is comprised of at least one layer of rubberized fabric.

7. The belt of claim 6 wherein said fabric is a square-woven fabric.

8. The belt of claim 6 wherein said fabric is a stress-relieved fabric.

9. The belt of claim 6 wherein said fabric is a tire cord fabric.

10. The belt of claim 6 wherein said fabric is a knitted fabric.

11. The belt of claim 1 wherein said second portion comprises at least one stress-resisting member embedded therein with each member extending longitudinally of said belt and disposed across the width of said belt.

12. The belt of claim 11 wherein each rib is of a generally trapezoidal cross-sectional configuration and each groove is of a generally V-shaped cross-sectional configuration.

13. The belt of claim 11 wherein said stress-resisting member is tire cord with the strength cords running longitudinally of said belt.

14. The belt of claim 11 wherein said stress-resisting member is a single cord wrapped helically around said second portion.

15. The belt of claim 14 wherein said cord is an aramid.

16. The belt of claim 14 wherein said cord has a space between adjacent turns of said cord of up to about 45% of the cord diameter.

* * * * *

UNITED STATES PATENT OFFICE
CERTIFICATE OF CORRECTION

Patent No. 4,216,679  Dated August 12, 1980

Inventor(s) Anderson W. Howerton et al

It is certified that error appears in the above-identified patent and that said Letters Patent are hereby corrected as shown below:

Column 2, line 32, FIG. "4" should be FIG. -- 2 --.

Signed and Sealed this

Twenty-eighth Day of October 1980

[SEAL]

Attest:

SIDNEY A. DIAMOND

Attesting Officer  Commissioner of Patents and Trademarks